June 13, 1950     J. E. WATSON ET AL     2,511,387
APPARATUS FOR CENTRIFUGALLY SEPARATING
SUSPENDED PARTICLES FROM GASEOUS MEDIA
Filed April 4, 1945
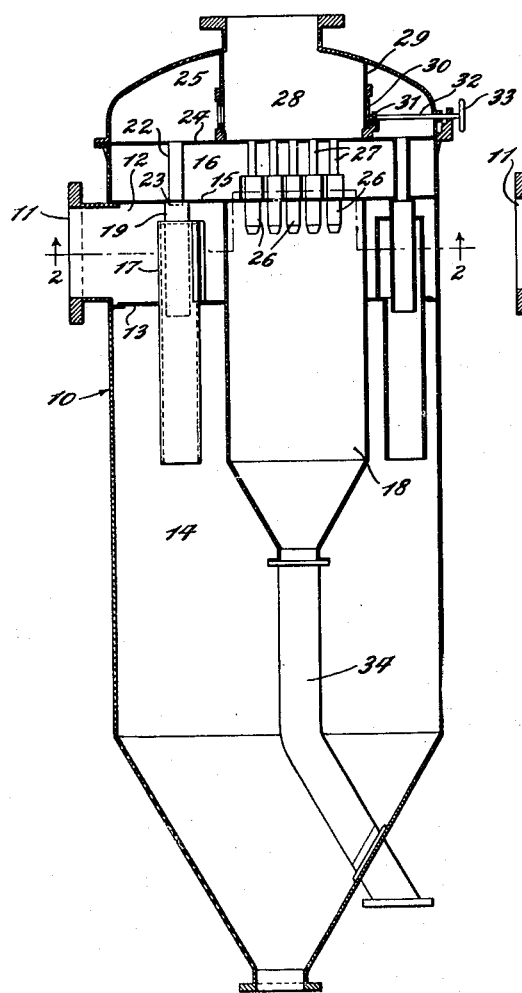
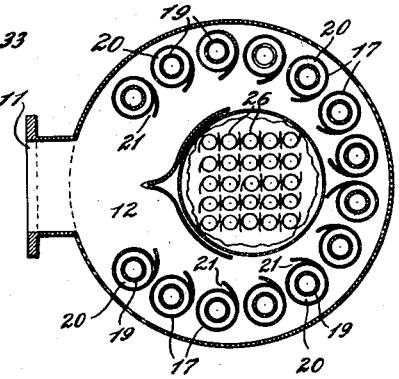
INVENTOR.
John E. Watson
and Charles B. McBride
BY
ATTORNEY Patented June 13, 1950

2,511,387

UNITED STATES PATENT OFFICE 2,511,387

APPARATUS FOR CENTRIFUGALLY SEPARATING SUSPENDED PARTICLES FROM GASEOUS MEDIA

John E. Watson, Westport, Conn., and Charles B. McBride, Port Chester, N. Y., assignors to The Aerotec Corporation, Greenwich, Conn., a corporation of Connecticut Application April 4, 1945, Serial No. 586,510

1 Claim. (Cl. 209—144)

Our present invention relates to an apparatus for centrifugally separating suspended particles, either solid or liquid, from a gaseous medium, such as air or industrial gases, and more particularly for separating in stages particles that are of different sizes, or which for other reasons may have varying resistance to separation.

In a flowing stream of air or other gases the larger or heavier particles are more readily thrown out of the gas stream by centrifugal force while the finer or lighter particles require somewhat different conditions for complete separation, and these conditions are somewhat more difficult or expensive to apply over a large volume of air or gas.

In our present invention we provide a compact apparatus in which, in one stage, the larger particles are separated from the air stream and the smaller or lighter particles are concentrated in a part of the air stream without being entirely separated, and, in a second stage, the finer particles are separated from the restricted body or stream of air into which they have been concentrated.

In this apparatus, therefore, the entire air stream need only be subjected to such a centrifuging as is necessary to take out the larger particles and to free a part of the air substantially from suspended material. The remaining finer particles concentrated in a smaller volume of air may then be separated in a smaller apparatus particularly suited for the separation of finer particles.

The various features of our invention are illustrated by way of example in the accompanying drawings in which:

Fig. 1 is a vertical section of a separator embodying a preferred form of the invention;

Fig. 2 is a section of the separator taken on line 2—2 of Fig. 1.

In the embodiment of the invention as illustrated in the accompanying drawings the apparatus is contained in a container 10 having an air or gas inlet 11. The air or gas entering through the inlet 11 is received in a primary separating chamber 12 formed between a lower partition 13 which separates it from a primary dust bin 14 and an upper partition 15 which separates it from a secondary separating chamber 16.

In the primary separating chamber 12 are a number of centrifugal tubes 17 or separators of relatively large diameter the lower ends of which are open and discharge into the dust bin 14. These centrifugal tubes are arranged about a secondary dust bin 18 extending from the upper partition 15 through the chamber 12 and the lower partition 13 downwardly into the dust bin 14. Each of the centrifugal separators 17 has an open ended off-take pipe 19 which opens into the secondary chamber 16 and extends downwardly into the centrifugal tube 17 to form an annular space 20. The tube 17 is closed at its upper end about the pipe 19 closing the annular space 20 at its top. Each centrifugal tube 17 also has a tangential inlet 21 leading into the annular space 20 above the lower end of the tube 19.

Dust laden air or gas supplied to the chamber 12 divides into separate streams, one for each tube 17, each entering its respective tube through the tangential inlet 21. The stream of air or gas is thus given a rotary motion in the annular space 20 and flows downwardly in a helical path to a distance below the lower end of the pipe 19. In this flow the larger or heavier particles are thrown outwardly to the inner surface of the tube and drop into the dust bin 14. The whirling gases thus freed of a large part of the suspended particles then pass upwardly through the off-take pipe 19. In this pipe the whirling of the air or gas continues with the result that the finer particles concentrate in a thin layer of gas adjacent the inner surface of the off-take pipe 19 while air or gas substantially free from suspended particles passes upwardly through the center thereof.

To remove the finer suspended particles the outer layer of air in which they are carried is separated from the inner column of substantially clear air or gas. For this purpose a secondary off-take pipe 22 is provided of a diameter somewhat less than that of the pipe 19 and extending coaxially with the latter from a height of the outlet end of the tube 19, or slightly lower, so as to leave a narrow annular opening 23. The rotating layer of air or gas moving upwardly adjacent the inner surface of the pipe 19 and carrying with it the suspended particles then passes through the opening 23 into the secondary separating chamber 16.

The clear or purified air or gas in the center of the off-take pipe 19 passes through the secondary off-take pipe 22 through an upper partition 24 into an off-take chamber and is received in compartment 25 of this chamber.

A number of centrifugal tubes 26 of smaller diameter than that of the tube 17 are mounted in the secondary separating chamber 16 to project through the partition 15, with the lower ends opening into the dust bin 18. The centrifugal tubes 26 are similar in construction to the tubes 17 but may have one or two intakes. Each tube is provided with an off-take pipe 27 which extends from its respective tube upwardly through the partition 24 and delivers into a secondary compartment 28 of the off-take chamber formed within the primary compartment 25 by means of a cylindrical partition 29 extending from the upper wall or partition 24 to the top of the container.

A number of openings are provided between the chambers 25 and 28 which may be closed partly, or to any desired extent, by means of a damper 30 operated by a pinion 31 and shaft 32 and handle 33. The damper 30 enables the relative pressures between the chambers 25 and 28 to be controlled, it being generally necessary to have a somewhat smaller pressure in the chamber 28 to obtain the proper velocity in the secondary centrifugal tubes 26.

In the centrifugal tubes 26 the diameter being smaller the angular velocity is much increased giving a greater centrifugal force while at the same time the space through which the dust particles must pass to reach the wall of the tubes is less. Accordingly the finer particles or dust which were not thrown out of the air in the tubes 17 may be separated with substantial completeness in the tubes 26 from the purified air entering the tubes 27.

In the above apparatus it is therefore possible to separate even the finest suspended particles without necessarily making the apparatus required for this purpose sufficiently large to treat the entire amount of air. Generally it requires more expensive and more extensive treatment to remove the finer particles, and it is of advantage to limit the amount of air that need be handled for this purpose to a small volume as is accomplished by the present invention. Also it may be desired in some cases to classify or collect separately the larger from the smaller particles or the heavier from the lighter and this may readily be accomplished by the above apparatus.

In this case the secondary dust bin 18 is provided with a draw-off pipe 34 extending through and delivering outside of the primary dust bin 14.

What we claim is:

Apparatus for separating suspended material from gases which comprises a primary bin for separated material, a primary separating chamber above said bin, a secondary separating chamber above said primary separating chamber, an off-take chamber above said secondary separating chamber, said off-take chamber being divided into a secondary compartment and a primary compartment about, and having a restricted passage to, said secondary compartment, a control valve for said restricted passage to regulate the resistance to flow therethrough centrifugal separators in said primary separating chamber each having a separated material discharge opening into said primary bin for separated material and an off-take pipe extending into said primary compartment and each having an annular opening into said secondary separating chamber, a secondary bin for separated material and centrifugal separators in said secondary separating chamber each having a separated material discharge opening into said secondary bin and an off-take pipe into said secondary off-take compartment.

JOHN E. WATSON.
CHARLES B. McBRIDE.

REFERENCES CITED

The following references are of record in the file of this patent:

UNITED STATES PATENTS

| Number | Name | Date |
| --- | --- | --- |
| 1,845,567 | Stebbins | Feb. 16, 1932 |
| 1,861,247 | Stebbins | May 31, 1932 |
| 2,090,955 | Taylor | Aug. 24, 1937 |
| 2,360,355 | McBride et al. | Oct. 17, 1944 |
| 2,372,514 | Pootjes | Mar. 27, 1945 |
| 2,382,253 | Penney | Aug. 14, 1945 |